Dec. 25, 1951   T. W. HORN   2,579,824
OIL TESTING CHART AND HOLDER THEREFOR
Filed July 11, 1949   2 SHEETS—SHEET 1
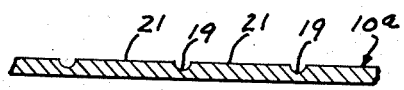
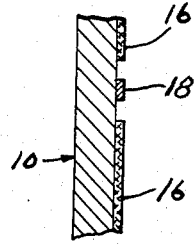
INVENTOR.
THURMAN W. HORN
BY
Jennings & Carter
ATTORNEYS Dec. 25, 1951  T. W. HORN  2,579,824
OIL TESTING CHART AND HOLDER THEREFOR
Filed July 11, 1949  2 SHEETS—SHEET 2
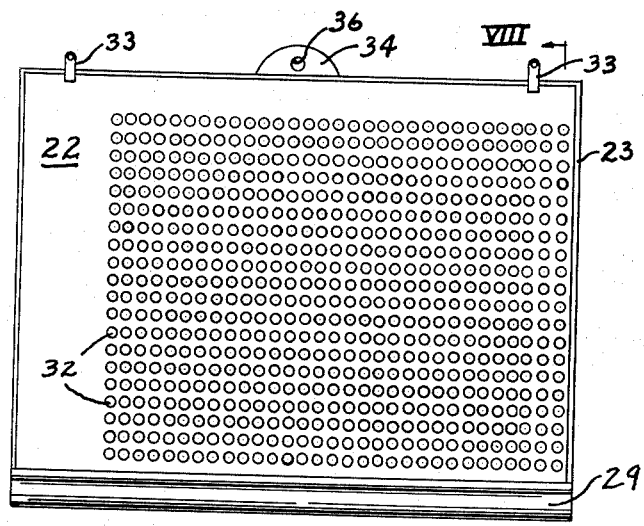
Fig. 6
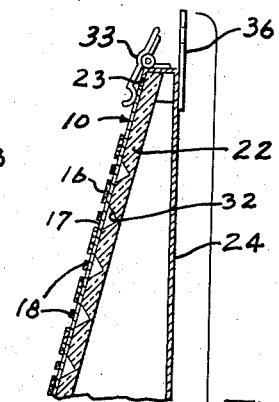
Fig. 8
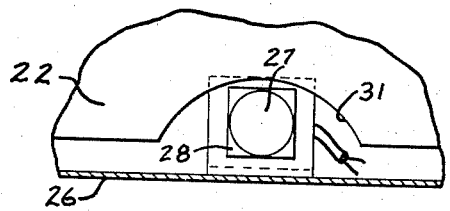
Fig. 10
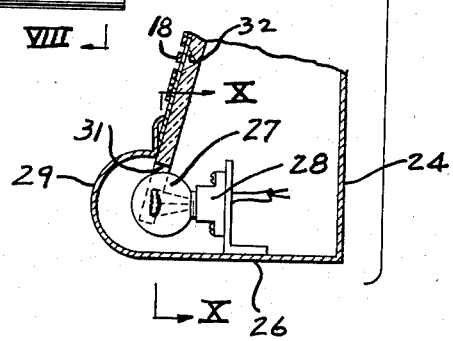
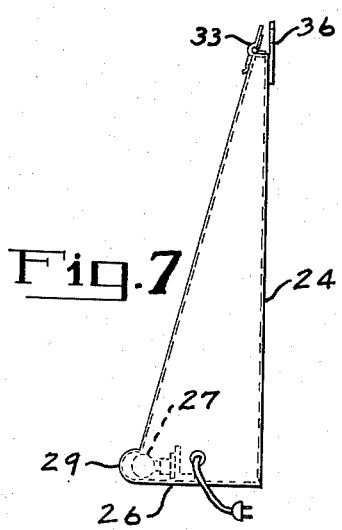
Fig. 7
Fig. 9
INVENTOR.
THURMAN W. HORN
BY
Jennings & Carter
ATTORNEYS Patented Dec. 25, 1951

2,579,824

UNITED STATES PATENT OFFICE 2,579,824

OIL TESTING CHART AND HOLDER THEREFOR

Thurman W. Horn, Anniston, Ala.

Application July 11, 1949, Serial No. 103,999

7 Claims. (Cl. 35—50)

My present invention relates to a device for testing lubricating oil and the like to determine the amount of foreign or discoloring material therein.

More particularly, my invention contemplates a device of the character designated by means of which the condition of lubricating oil in an internal combustion engine may be determined, and contemplates such a device embodying a piece or section of oil absorbent material, such for instance, as ordinary blotter paper, having thereon spots or dots of a suitable paint or the like of a color to be partially or wholly obliterated when a drop of the oil to be tested is applied thereto, the degree of obliteration indicating the condition of the oil.

Another object is to provide a device of the character designated having a plurality of pieces or sections of absorbent paper laid cut and arranged in horizontal rows and correlated to a specific engine, and in vertical rows correlated to the day of the month, whereby an operator may determine, from day to day and by visual inspection of the device the condition of the oil in a plurality of engines, thus to determine if the oil or oil filtering equipment is being changed or cleaned in the several engines at the proper time.

Another object is to provide a holder or frame for a chart carrying the pieces or sheet of absorbent material, such for instance pieces or a sheet of ordinary ink blotter paper, and which shall have means to illuminate the point at which the test oil is applied to the piece or sheet of blotter paper, resulting in an attractive and efficient device by means of which the operator of a fleet of vehicles having internal combustion engines may easily keep track of the oil maintenance in each.

A further object is to provide a device of the character designated in which a sheet of ordinary blotter paper is covered on the major part of its front surface with a coat of opaque paint or the like of a color approximating that of clean motor oil, namely, amber to light orange, there being left unpainted a plurality of horizontally and vertically aligned rows of spaces, together with a dot or spot of paint at the middle of each unpainted space of a color approximating that of oil which has become discolored to the point of unsuitableness as a lubricant, namely dark brown, whereby the opaque paint serves to complement the color of good oil and to contrast with the color of dirty oil, aiding the user in making accurate visual comparison with the dot of brown paint.

A further object is to provide a device for testing oil in which the means to illuminate a piece of absorbent paper embodies a sheet of light conducting material disposed behind and in contact with the absorbent sheet, together with conical openings drilled partially through the sheet of light conducting material immediately behind the spots of paint, and which are effective to concentrate the light directly behind each of the spots of paint, thus to further accentuate the comparative difference between the color of the paint and oil.

A device illustrating the features of my invention is shown in the accompanying drawing forming a part of this application, in which:

Fig. 1 is a fragmental front elevational view of a piece of blotter paper which is laid out to form my improved chart;

Fig. 2 is a fragmental front elevational view of the sheet shown in Fig. 1, drawn to an enlarged scale and illustrating the use of the device;

Fig. 3 is an enlarged sectional view taken generally along line III-III of Fig. 2;

Fig. 4 is a view corresponding to Fig. 1 and showing a modified form of the chart;

Fig. 5 is a detailed sectional view taken generally along V-V of Fig. 4;

Fig. 6 is a front elevational view of my improved holder for supporting and illuminating the sheet of absorbent material shown in Figs. 1 and 4;

Fig. 7 is an end elevational view of the device shown in Fig. 6;

Fig. 8 is an enlarged fragmental sectional view taken generally along lines VIII-VIII of Fig. 6 and showing a sheet of absorbent material in place on the device;

Fig. 9 is an enlarged detailed sectional view through one of the conical openings drilled partially through the front of the transparent light conducting sheet of material shown in Fig. 8; and, Fig. 10 is detailed sectional view taken generally along line X-X of Fig. 8.

Referring now to the drawings for a better understanding of my invention, and more particularly to Figs. 1, 2 and 3 thereof, I show a sheet 10 of absorbent material which may be ordinary white or buff colored ink blotter paper. Along the side edge 11 I provide a vertically aligned row of spaces 12 for entering identifying indicia such for instance, as the identifying numbers for a plurality of motor vehicles. Along the upper edge I provide a plurality of lines 13 defining between them a plurality of spaces 14 for entering the day of the month.

The remainder of the front of the sheet 10 is painted as indicated with opaque paint 16 preferably amber to orange in color. This paint is preferably of a type to soak partially into the paper and preferably is opaque. This paint extends over the entire area of the front except for the spaces occupied by columns 12 and 14 and other spaces such as 17 which are left unpainted. The spaces 17 are collated horizontally and vertically with the spaces 12 and 14. The spaces 17 thus provide a plurality of vertically and horizontally aligned rows of unpainted spaces, one row for each vehicle, and one space for each day of the month. The spaces 17 may be of any desired outline, but I preferably make them circular as shown in the drawing.

Adjacent the center of the unpainted spaces 17, I provide a dot or spot 18 of paint, preferably of a dark brown color which is insoluble in ordinary lubricating oil. While the color of the paint 18 may vary, it should be a color approximating the color of oil which has been discolored to the extent that it is no longer suitable for lubricating the particular engine. In practice, I have found that a suitable color is dark brown.

In use, the sheet 10 is kept in a place where oil is tested each day, for instance around the inspection or grease rack where the vehicles are serviced. The operator touches the center of the space 17 corresponding to current day of the month with the engine oil gauge stick, thereby placing a drop of oil thereon in the space 17, over the dot of paint 18. As the oil becomes more polluted or discolored from day to day the dot of paint 18 begins to disappear as indicated in Fig. 2. Referring to the uppermost row of spaces 17, Fig. 2, it will be seen that the oil in vehicle A on the first day of the month is practically free of discoloring matter. On the second, third, fourth, fifth and sixth days the oil became progressively darker, as indicated by the increase in stippling, which indicates that the discoloring matter in the oil commences to obliterate the spot of paint 18. On the sixth day the oil still was relatively good in vehicle A. On the other hand, and referring to the second row of spaces, Fig. 2, it will be seen that the oil in vehicle B became wholly unsuitable for lubricating purposes on the fifth day of the month, a fact which is indicated by the oil having covered completely and obliterated the dot 18. Further, it would appear from the chart that the oil in the vehicle B was changed on the sixth day. If the oil in a given engine becomes dirty after an abnormally short period of operation, the length of which will be known or can readily be ascertained by the person in charge of maintenance, the chart indicates that something is wrong with the engine which should be checked, for instance that the oil filter should be cleaned or renewed.

In Figs. 4 and 5 I show a modified form of my invention in which the sheet 10a of the blotter material, instead of being painted on its outer surface has provided therein a plurality of connecting depressions 19 which serve to isolate the material into square blocks 21. The depressions 19 may be placed in the paper by means of suitable rollers or the like, thus in effect compressing the fibers of the paper tightly together at the bottom of the grooves or recesses. This arrangement serves to wholly isolate the areas 21 from each other whereby oil placed therein does not flow to adjacent areas or blocks 21. In each of the areas 21 I place a dot 18a of the brown paint heretofore referred to.

The remaining front of the modified sheet just described is identical with that described in Figs. 1 and 2 insofar as the vertical and horizontal spaces are concerned. In testing some types of oil it is not necessary that the sheet be painted with the amber or orange colored paint, and instead of relying upon such paint to isolate the areas 17 or 21 where the brown dot of paint 18 or 18a is placed, I isolate the areas by means of the depressions 19.

Referring now more particularly to Fig. 6 I show a combined holder and illuminating device on which I may use either of the sheets 10 or 10a. The device comprises a sheet 22 of light conducting material, such for instance, as a sheet of methyl methacrylate. This sheet of material is suitably supported along its periphery by means of flanges 23 of a sheet metal housing. The rear 24 of the housing serves as a reflector, and the bottom 26 thereof serves as a support for the entire device.

Disposed to illuminate the lower edge of the sheet 22, I provide an incandescent lamp 27, suitably mounted in a socket 28. The lower front edge of the frame may have an outwardly rolled section 29 whereby the lower edge 31 of the sheet 22 is exposed to the light 27.

On the front side of the sheet 22 I provide a plurality of conical shaped depressions 32. These depressions are aligned horizontally and vertically, and are placed on centers corresponding to the centering of the spaces 17 or 21. The conical shaped depressions 32 are drilled substantially through the sheet 22, but stop short of actual penetration thereof.

Mounted along the front of the frame 22 I provide a pair of spring biased clips 33 which are adapted to clip over and hold the sheet 10 or 10a on the front of the sheet of the material 22, and with each of spaces 17 or 21 thereof directly above the center of one of the openings 32. I may provide a bracket 34 having therein an opening 36 by means of which the entire frame may be supported from a wall.

In use, I secure the sheet 10 or 10a to the outer face of the sheet of material 22 and with the spaces 17 or 21 in alignment with the openings 32. With the light 27 energized, it will be found that light entering the sheet of transparent light conducting material is, by reason of the conical shaped openings 32, pin pointed directly behind each of the spaces 17 or 21. When a drop of oil is applied to ordinary blotter paper the paper becomes considerably more translucent than the paper is without the oil. I have found that I am able to obtain a more accurate comparison of the discoloration of oil by reference to the dots of paint 18 or 18a with the sheet in position on and illuminated by the frame. With the openings 32 directly behind the spots of paint I provide in effect an individual incandescent lamp behind each spot of paint, and have discovered that this arrangement aids considerably in using the chart. I have found that the light entering the lower edge of the sheet 22, as well as that reflected by the reflector 24 and reentering the sheet 22 is in fact pin pointed directly behind the spots of paint 18 or 18a due to the conical openings 32.

From the foregoing it will be apparent that I have devised an improved lubricant testing device which is simple of manufacture and which is effective to give to an operator of a fleet of vehicles a visual indication of the condition of oil therein. My improved device is particularly useful to operators of fleets of vehicles, for instance bus lines, taxicabs, and the like, whereby the foreman or superintendent in charge of maintenance has before him always a picture of the maintenance of the vehicles with respect to oil in each vehicle. I have also found that by painting the sheet of material with the amber to orange colored paint as shown in Figs. 1 and 2, such paint effectively blocks off the spaces 17 from each other, thus preventing oil placed on one space from flowing to the opposite space. In actual practice I have found that my invention is economical, and that it saves considerable wear and tear on vehicles by encouraging the proper maintenance of the lubricating oil therein.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. In a device for testing lubricating oil and including a sheet of oil absorbent material having on one surface a plurality of spots of coloring material disposed relative to each other in a geometrical pattern, said spots of coloring material approximating the color of lubricating oil and the like discolored to the degree of unsuitableness for use as a lubricant, and a sheet of light conducting material behind the sheet of oil absorbent material, the improvement which comprises, providing a plurality of conical depressions extending partially through the sheet of light conducting material and with the bases thereof adjacent the sheet of oil absorbent material, said depressions being disposed relative to each other in a geometrical pattern corresponding to the pattern of said spots of coloring material, and means introducing light into said sheet of light conducting material.

2. The improvement set forth in claim 1 in which said spots of coloring material and said conical depressions are vertically and horizontally aligned on their respective sheets of material.

3. The improvement set forth in claim 1 in which the spots of coloring material on said sheet of oil absorbent material are disposed relative to each other in a plurality of horizontal and vertically aligned rows.

4. A device for visually indicating the condition of lubricating oil in the crank case of an internal combustion engine comprising a sheet of paper having a series of oil absorbent spots thereon of a color approximating that of oil which has reached a condition where it is no longer suitable for use as a lubricant, means on the surface of said sheet between said spots inhibiting the spread of oil from one spot to another, each of said spots being surrounded by a lighter colored area on said sheet and each adapted to receive a specimen of oil taken from said crank case.

5. A device for testing lubricating oil comprising a sheet of blotting paper having a surface area coated with a material over the major portion thereof, said material making the coated surface relatively non oil absorbent and said surface having uncoated localized areas therein which are relatively more oil absorbent than said coated area, and reference indicia disposed within said uncoated localized areas for visual comparison of specimens of oil therewith.

6. A device for visually indicating the condition of lubricating oil in the crank case of an internal combustion engine comprising a sheet of oil absorbent paper having a multiplicity of oil absorbent reference spots thereon each of which is adapted to receive a specimen of oil taken from said crank case, and means on the surface of said sheet of paper separating the spots from each other relative to spread of oil between the same and aligning the spots in vertical and horizontal rows, said spots being of a color approximating that of oil which has reached a condition when no longer fit for use as a lubricant.

7. A device for visually indicating the condition of lubricating oil in the crank case of an internal combustion engine comprising a sheet of blotting paper having joined vertical and horizontal compressed relatively non-bibulous portions on a surface thereof dividing the sheet into individual relatively more bibulous areas substantially isolated from each other relative to absorption of oil one from the other, said bibulous areas being aligned by said compressed portions into horizontal and vertical rows, and spots of coloring material in each of said bibulous areas of a color approximating that of oil when no longer fit for use in said crank case.

THURMAN W. HORN.

REFERENCES CITED

The following references are of record in the file of this patent:

UNITED STATES PATENTS

| Number | Name | Date |
| --- | --- | --- |
| 209,924 | Rouaix | Nov. 12, 1878 |
| 1,199,310 | Shapiro | Sept. 26, 1916 |
| 1,741,748 | White | Dec. 31, 1929 |
| 1,843,980 | Hotchner | Feb. 9, 1932 |
| 1,854,143 | John | Apr. 12, 1932 |
| 1,925,254 | John | Sept. 5, 1933 |
| 2,068,827 | Tompkins | Jan. 26, 1937 |
| 2,084,050 | Van Bloem | June 15, 1937 |
| 2,245,557 | Franzman | June 17, 1941 |
| 2,294,645 | Wurzburg | Sept. 1, 1942 |
| 2,297,851 | Wyss | Oct. 6, 1942 |
| 2,302,224 | Jones | Nov. 17, 1942 |
| 2,343,191 | Kinlein | Feb. 29, 1944 |